Jan. 28, 1930.    J. A. LUNDQUIST    1,745,263
PLUMB BOB REEL
Filed Sept. 27, 1928
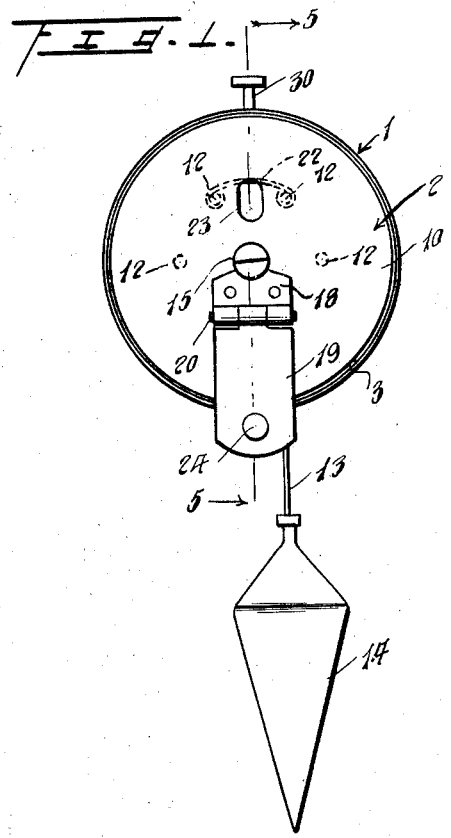
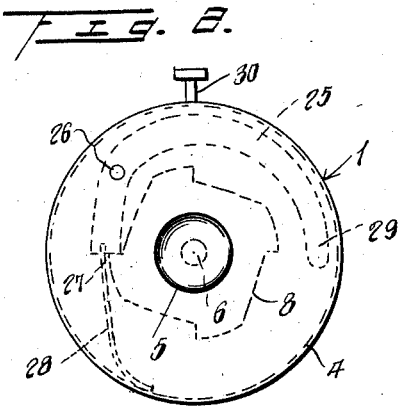
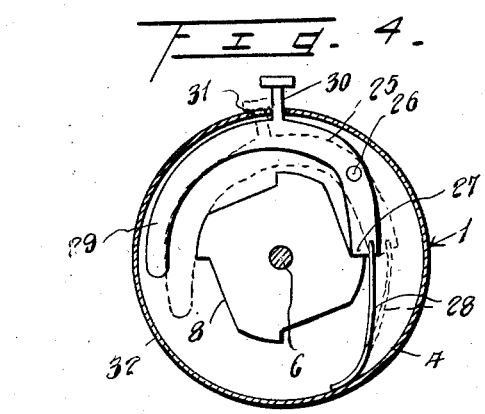
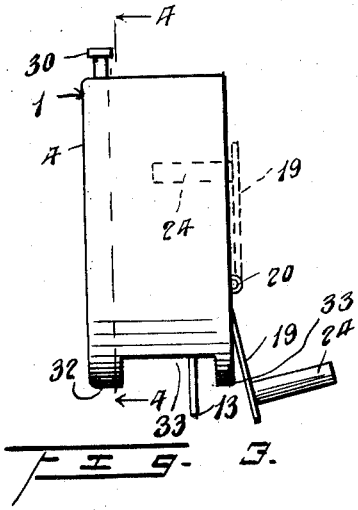
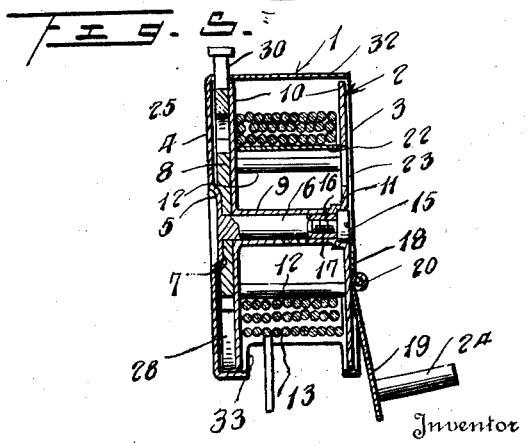
Inventor
J. A. Lundquist.
By L. F. Randolph Jr.
Attorney Patented Jan. 28, 1930

1,745,263

UNITED STATES PATENT OFFICE

JOHN A. LUNDQUIST, OF LOS ANGELES, CALIFORNIA

PLUMB-BOB REEL

Appication filed September 27, 1928. Serial No. 308,756.

The invention relates to reels for holding the lines of plumb bobs and has for its principal object the provision of an improved construction of manually operated reels in which the line is wound on the reel manually and played off therefrom by means of the weight of the plumb bob, the reel provided with a ratchet and pawl mechanism for holding the reel in a wound position, said pawl having an extension that engages the ratchet wheel in unwinding operation to act as a brake to regulate the speed of the unwinding of the plumb bob line.

The invention will be described in detail hereinafter and will be found illustrated in the accompanying drawings in which, Figure 1 is a front view in elevation of improved plumb bob reel, Figure 2 is a rear view in elevation, Figure 3 is a side view in elevation, Figure 4 is a sectional view on a plane indicated by the line 4—4 of Figure 3, and Figure 5 is a sectional view on a plane indicated by the line 5—5 of Figure 1.

In the drawings similar reference characters are used to designate corresponding parts throughout the several views.

The improved plumb bob reel comprises a casing member 1 and a reel member 2 mounted therein through the open front portion 3 of the casing, the rear wall 4 having the inwardly extending boss 5 arranged centrally thereof and on which is mounted the forwardly extending stub shaft 6, said boss by engaging in a recess 7 in the ratchet wheel 8 secured to the rear of the reel 2 serves to space it from the rear wall 4. The reel has a tubular member 9 that is journaled on the shaft 6 and spaced flanges or disks 10, the outer of said disks having a recess 11 for the purpose hereinafter described. 12 designates rods connecting disks 10 that provide a drum for the plumb bob line 13, 14 indicating the plumb bob secured to the end of said line. The reel member 2 is held in position in the casing 1 by means of a headed screw 15 having its threaded shank 16 engaging a threaded opening 17 in the end of the stub shaft 6 and its head being countersunk in the recess 11. 18 indicates a plate secured to the outer of the two disks 10 and having a handle 19 hingedly secured thereto as shown at 20 to wind the line 13 on the reel, said handle 19 being adapted to be folded into the position shown in broken lines in Figure 3 when not in use. To prevent interference of the line 13 with the folding of the handle 19, a plate 22 is provided and secured to the cross rods 12 opposite to the handle 19, and the outer disk 10 is provided with an opening 23 to receive the crank arm 24 of the handle. 25 indicates a pawl that is pivotally mounted as shown at 26 to the rear wall 4 and has one end 27 normally held in position to engage the teeth of the ratchet wheel 8 by means of a leaf spring 28. The other end of the pawl 25 is extended and inwardly curved as shown at 29 and adapted when the end 27 is out of engagement with the teeth of the ratchet wheel 8 to be pressed into engagement with the periphery of the ratchet wheel 8 to act as a brake to regulate the unwinding of the line 13 from the reel. 30 indicates a lug or projection on the pawl 24 extending through a slotted opening 31 in the side wall 32 of the casing 1 for manual operation of the pawl 25 to release the end 27 thereof from engagement with the teeth of the ratchet wheel and to regulate the pressure of the curved end 29 when engaged with the periphery of the ratchet wheel 8, as hereinbefore stated. The side wall 32 of the casing 1 is provided with a slotted opening 33 through which is extended the line 13 carrying the plumb bob 14.

What is claimed is:—

1. A plumb bob reel, comprising a casing open at one side, a stub shaft in said casing, a reel journaled on said shaft, means engaging the shaft to hold the reel thereon, a ratchet wheel secured to the reel, a pawl pivotedly mounted in the casing to engage the teeth of the ratchet wheel by one of its ends, spring means to hold said pawl engaged with the ratchet wheel, the other end of said pawl extended to engage the periphery of the ratchet wheel and form a brake, and manually actuated means to release the first end of the pawl from engagement with the ratchet wheel and to hold the other end in engagement therewith.

2. A plumb bob reel, comprising a casing having a vertical wall and a cylindrical side wall, a stub shaft supported by said vertical wall, a reel journaled on said stub shaft, means engaging the shaft to hold the reel thereon, a ratchet wheel secured to the reel, a curved pawl pivotally mounted intermediate of its ends on said vertical wall, one end of said pawl being adapted to engage the teeth of said ratchet wheel to hold the reel from unwinding movement, a spring engaging the pawl to actuate said end of the pawl into ratchet engaging position, the other end of said pawl being adapted to drag on ratchet wheel and provide a brake for the reel, and a lug on said pawl extending through the circumferential wall of the casing to actuate the pawl against the resistance of said spring.

In testimony whereof I affix my signature.

JOHN A. LUNDQUIST.